(12) United States Patent
Lu

(10) Patent No.: US 7,700,180 B2
(45) Date of Patent: Apr. 20, 2010

(54) COMPONENTS INTEGRATING STRUCTURE

(75) Inventor: Xiu-Qing Lu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 167 days.

(21) Appl. No.: 11/863,274

(22) Filed: Sep. 28, 2007

(65) Prior Publication Data

US 2008/0282528 A1  Nov. 20, 2008

(30) Foreign Application Priority Data

May 15, 2007  (CN) .................. 2007 1 0200616

(51) Int. Cl.
*B32B 3/02* (2006.01)

(52) U.S. Cl. .................. 428/172; 428/60; 428/66.7; 428/161; 428/192

(58) Field of Classification Search ................ 428/64.1, 428/66.7, 58, 60, 161, 163, 167, 172, 192
See application file for complete search history.

(56) References Cited

U.S. PATENT DOCUMENTS

| 3,839,080 | A | * | 10/1974 | Jarema et al. | ............ 428/312.2 |
| 3,964,231 | A | | 6/1976 | Budich et al. | |
| 4,468,210 | A | | 8/1984 | McCutchan, Jr. | |
| 4,723,469 | A | * | 2/1988 | Vogt | ........................ 84/314 R |
| 5,244,746 | A | * | 9/1993 | Matsui et al. | ............... 428/609 |
| 6,706,367 | B2 | * | 3/2004 | Lienesch et al. | ............ 428/167 |

FOREIGN PATENT DOCUMENTS

| CN | 1330909 A | 1/2002 |
| TW | 200716302 | 5/2007 |

* cited by examiner

*Primary Examiner*—Donald Loney
(74) *Attorney, Agent, or Firm*—Frank R. Niranjan

(57) ABSTRACT

An exemplary components integrating structure (10) includes a metallic member (12) defining a locking groove (126) and a plastic member (14) integrally formed with the metallic member. A portion of the plastic member is received in the locking groove of the metallic member.

12 Claims, 3 Drawing Sheets

COMPONENTS INTEGRATING STRUCTURE

BACKGROUND OF THE INVENTION

1. Field of the Invention

The present invention generally relates to components integrating structures, and more particularly to a components integrating structure used in a small and thin component of an electric device.

2. Discussion of the Related Art

Most electric device components are made of metal or plastic. When compared to metal, plastic has many advantages such as a lower melting point, better fluidity, and can be easily molded into various components by injection molding. In addition, raw materials for making plastic components are cheaper and the mass production of plastic components by the method of injection molding is cheaper. However, a surface hardness of the injection molded plastic components are generally inferior to that of metal, thus the components made of plastic are easier to deform and/or scratched as compared to components made of metal.

To reduce production cost, and improve scratch resistance, some components may be assembled by an exterior metallic member and an inner plastic member. The exterior metallic member and inner plastic member are firmly fixed together with a fastening and a latching member engaged together. The fastening and the latching member are formed on the metal and plastic, respectively, or vice versa.

Forming and connecting the fastening member and the latching member together may be appropriate for components, of a relative large size, appropriate for devices such as shelf or car stereos. However, forming and connecting the fastening member and the latching member will complicate design configuration of smaller and thinner components for small size devices like mobile phones.

Therefore, what is needed is a new components integrating structure that can overcome the above-mentioned shortcomings, for use in small and thin components.

SUMMARY

A components integrating structure includes a metallic member defining a locking groove and a plastic member integrally formed with the metallic member. A portion of the plastic member is received in the locking groove of the metallic member.

Other novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating principles of the present components integrating structure. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present components integrating structure in detail.

Figure 1:
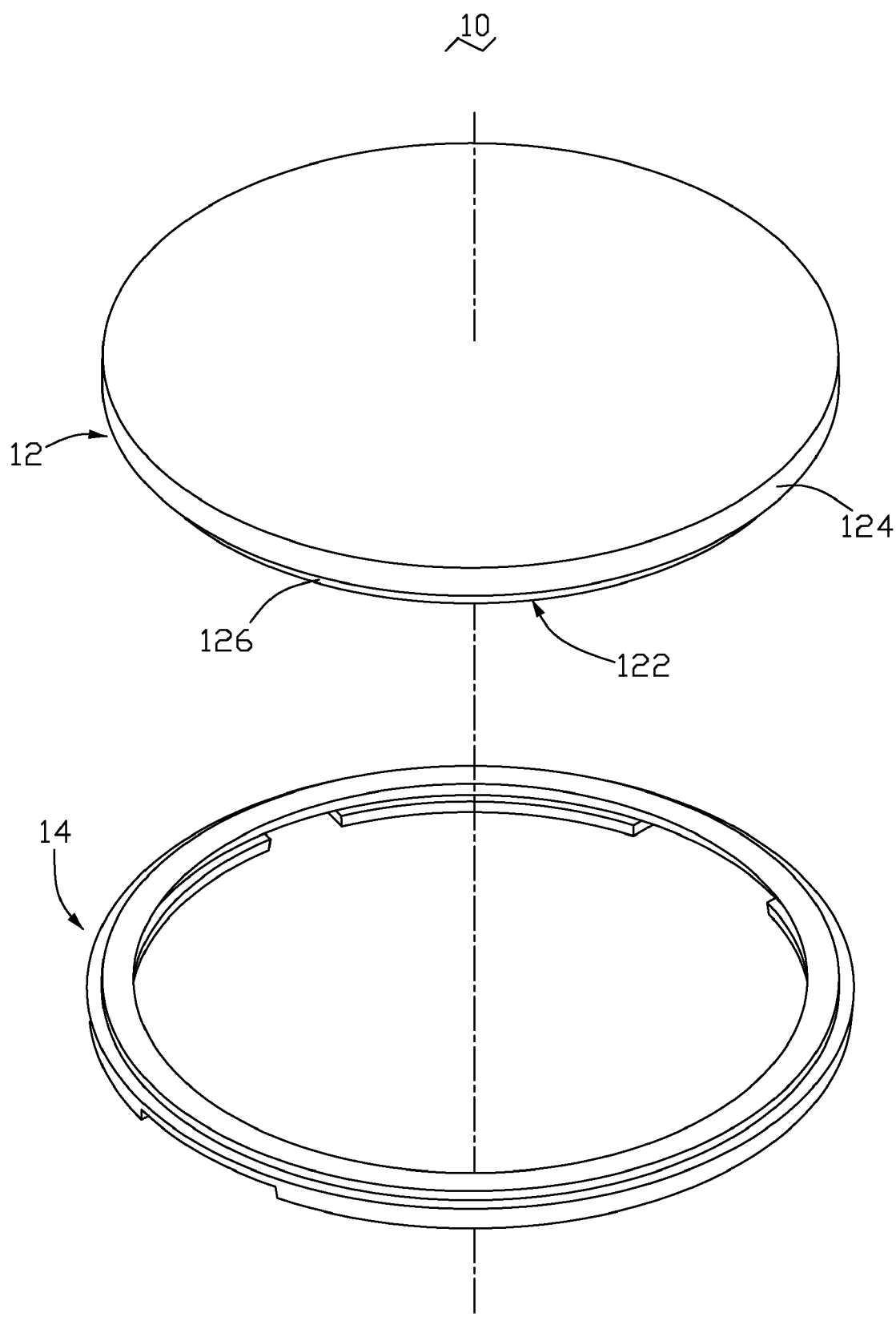
FIG. 1 is an exploded view of a components integrating structure in accordance with a first preferred embodiment of the present invention.
Figure 2:
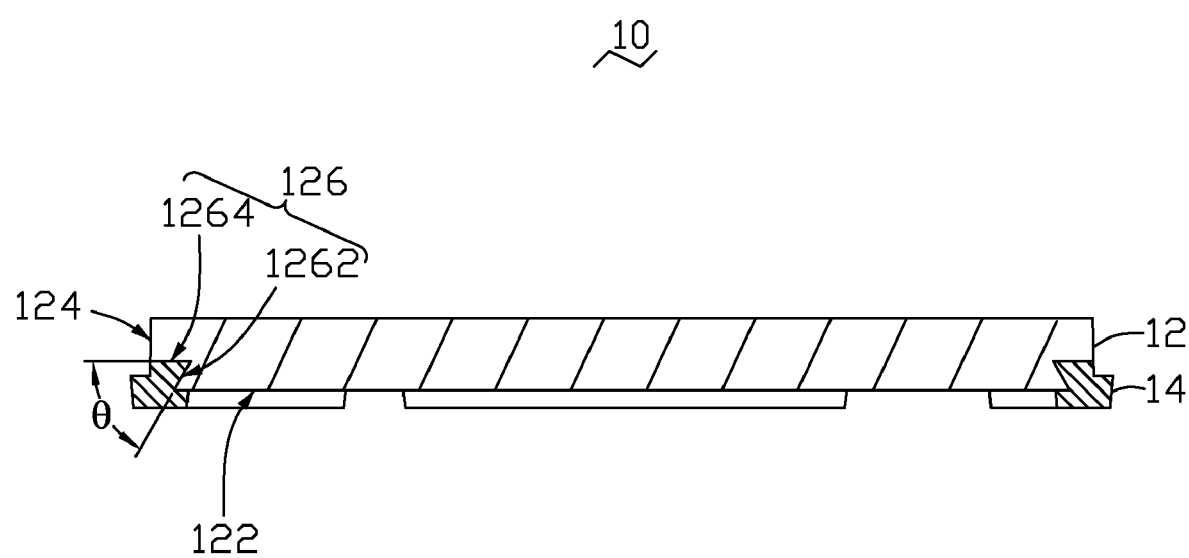
FIG. 2 is an assembled, side, cross-sectional view of the components integrating structure of FIG. 1.

Referring to FIG. 1, an integrating structure 10 according to a first embodiment is shown. The integrating structure 10 can be utilized in small and thin components of electronic devices, such as input keys of mobile phones, MP3 players or MP4 players. The integrating structure 10 includes a metallic member 12 and a plastic member 14. The metallic member 12 is generally used as a shell, and may often come into contact with external things, such as fingers of users. The metallic member 12 includes a bottom surface 122, a side surface 124, and a locking groove 126 defined between the bottom surface 122 and the side surface 124. Also referring to FIG. 2, the plastic member 14 is generally used to connect with other components of the electronic devices. The plastic member 14 is connected to the metallic member 12 with a portion of the plastic member 14 is received/formed in the locking groove 126 of the metallic member 12. The portion of the plastic member 14 received/formed in the locking groove 126 is configured for enhancing a bonding strength between the metallic member 12 and the plastic member 14.

To prepare the metallic member 12 easily, a configuration of the metallic member 12 can be simplified. In the illustrated embodiment, the bottom surface 122 is circular. The side surface 124 is cylindrical in shape. The locking groove 126 encircles the side surface 124. That is, the locking groove 126 extends along the side surface 124. A vertical cross-section of the locking groove 126 is V-shaped. The locking groove 126 defined by a first sidewall 1262 and a second sidewall 1264. The first sidewall 1262 connects with the bottom surface 122. The second sidewall 1264 connects with the side surface 124 and is parallel to the bottom surface 122. An angle $\theta$ defined between the first sidewall 1262 and the second sidewall 1264 can be in a range from about 50 degrees to about 70 degrees. To prepare the locking groove 126 easily, the angle $\theta$ can be in the range from about 55 degrees to about 65 degrees, preferably, the angle $\theta$ is about 60 degrees. A material of the metallic member 12 can be one of aluminum alloy, magnesium alloy, and stainless steel. Preferably, the material of the metallic member 12 is aluminum alloy. According to the material of the metallic member 12, the metallic member 12 can be manufactured by impact molding, computerized numerical control machining, or any combinations thereof.

A material of the plastic member 14 can be one of acrylonitrile-butadiene-styrene copolymer and nylon. Preferably, the material of the plastic member 14 is acrylonitrile-butadiene-styrene copolymer. The plastic member 14 can be integrally formed with the metallic member 12 by injection molding, such as insert molding. A method of insert molding can include steps of: placing the metallic member 12 in a mold, injecting melted plastic in the locking groove 126 of the metallic member 12 in the mold, thereby forming the plastic member 14.

The plastic member 14 is prepared by injection molding, thus even if a configuration of the plastic member 14 is complicated, the plastic member 14 can be easily formed. Furthermore, because the portion of the plastic member 14 is received in the locking groove 126, the bonding strength between the metallic member 12 and the plastic member 14 is enhanced. As the plastic member 14 is integrally formed with the metallic member 12, an assembling process of the integrating structure 10 is simplified, and an assembly efficiency is improved.

Figure 3:
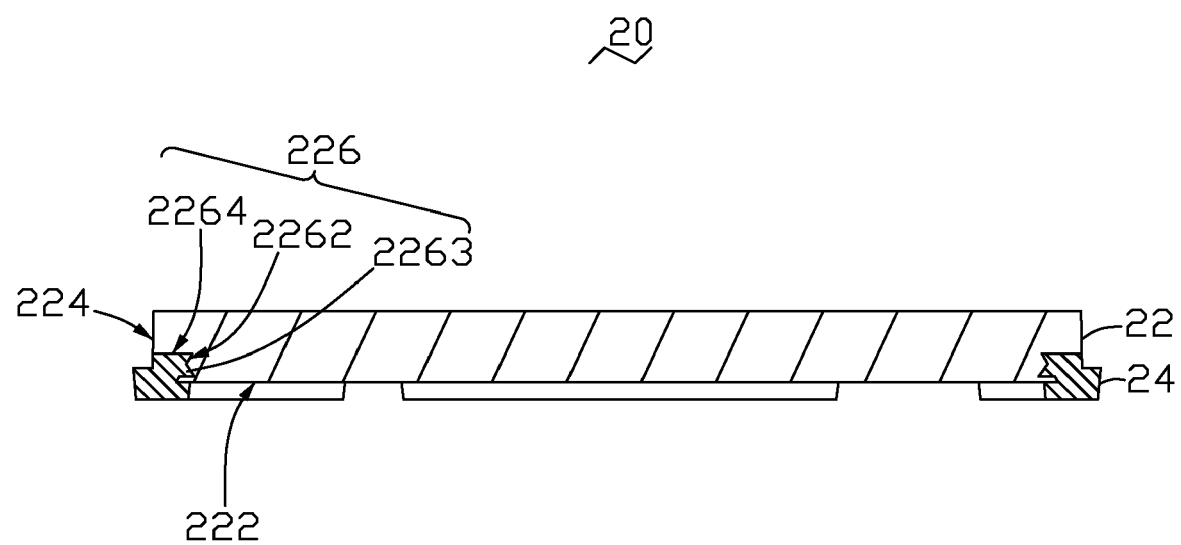
FIG. 3 is a side, cross-sectional view of a components integrating structure in accordance with a second preferred embodiment of the present invention.

Referring to FIG. 3, a components integrating structure 20 according to a second embodiment is shown. The integrating structure 20 includes a metallic member 22 and a plastic member 24 integrally formed with the metallic member 24. The metallic member 22 includes a bottom surface 222, a side surface 224 and a locking groove 226. The locking groove 226 is defined by a first sidewall 2262 connecting with the bottom surface 222, a second sidewall 2264 connecting with the side surface 224, and a depression 2263 formed at the first sidewall 2262. In the illustrated embodiment, a vertical cross-section of the depression 2263 is V-shaped. The depression 2263 can increase a contact area between the metallic member 22 and the plastic member 24, thus the bonding strength between the metallic member 22 and the plastic member 24 can be further enhanced. In an alternative embodiment, if at least one of the first sidewall 2262 and the second sidewall 2264 has a rough surface, the depression 2263 to improve the bonding strength between the metallic member 22 and the plastic member 24 may be omitted.

It is noted that the scope of the present components integrating structures is not limited to the embodiments described above. For example, the locking groove 126, 226 cannot encircle the side surface 124. The locking groove 126, 226 can be directly defined in the side surface 124, 224 or the bottom surface 122, 222. In addition, In the components integrating structure 20, if the depression 2263 occupies a great area of the first sidewall 2262 and the second sidewall 226, the bonding strength between the metallic member 22 and the plastic member 24 can also be improved, even though the locking groove 226 is an open ring in shape or a angle between the first sidewall 2262 and the second sidewall 2264 is more than 70 degrees.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A components integrating structure, comprising:
   a metallic member defining a locking groove; and
   a plastic member integrally formed with the metallic member;
   wherein the metallic member comprises a bottom surface and a side surface, the locking groove is configured on the side surface, the locking groove is defined by a first sidewall connecting the bottom surface and a second sidewall connecting the side surface, a depression is formed at the first sidewall, at least one portion of the plastic member is received in the locking groove and the depression of the metallic member.

2. The components integrating structure as claimed in claim 1, wherein a cross-section of the locking groove is V-shaped, and an angle defined by the first sidewall and the second sidewall is in a range from about 50 degrees to about 70 degrees.

3. The components integrating structure as claimed in claim 1, wherein a cross-section of the depression is V-shaped.

4. The components integrating structure as claimed in claim 2, wherein at least one of the first sidewall and the second sidewall has a rough surface.

5. The components integrating structure as claimed in claim 2, wherein the locking groove encircles the side surface.

6. The components integrating structure as claimed in claim 1, wherein a cross-section of the locking groove is V-shaped, and an angle defined by the first sidewall and the second sidewall is in the range from about 55 degrees to about 65 degrees.

7. The components integrating structure as claimed in claim 1, wherein the a cross-section of the locking groove is V-shaped, and an angle defined by the first sidewall and the second sidewall is about 60 degrees.

8. The components integrating structure as claimed in claim 1, wherein the plastic member integrally formed with the metallic member is preformed by injection molding.

9. The components integrating structure as claimed in claim 1, wherein a material of the metallic member is selected from the group consisting of aluminum alloy, magnesium alloy and stainless steel.

10. The components integrating structure as claimed in claim 1, wherein a material of the metallic member is aluminum alloy.

11. The components integrating structure as claimed in claim 1, wherein a material of the plastic member is selected from the group consisting of acrylonitrile-butadiene-styrene copolymer and nylon.

12. The components integrating structure as claimed in claim 1, wherein a material of the plastic member is acrylonitrile-butadiene-styrene copolymer.

* * * * *